United States Patent
Takahashi

(10) Patent No.: US 8,634,547 B2
(45) Date of Patent: Jan. 21, 2014

(54) ECHO CANCELLER OPERATIVE IN RESPONSE TO FLUCTUATION ON ECHO PATH

(75) Inventor: Katsuyuki Takahashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 921 days.

(21) Appl. No.: 12/662,934

(22) Filed: May 12, 2010

(65) Prior Publication Data

US 2010/0290615 A1 Nov. 18, 2010

(30) Foreign Application Priority Data

May 13, 2009 (JP) ................................. 2009-116659

(51) Int. Cl.
*H04M 1/00* (2006.01)
*H04M 9/00* (2006.01)
*H04M 9/08* (2006.01)

(52) U.S. Cl.
USPC ............. 379/406.08; 379/406.06; 379/406.01

(58) Field of Classification Search
USPC ........................... 379/406.08, 406.06, 406.01
See application file for complete search history.

(56) References Cited

U.S. PATENT DOCUMENTS

| | | | |
|---|---|---|---|
| 6,317,501 B1 | 11/2001 | Matsuo | |
| 6,781,993 B1 * | 8/2004 | Takechi et al. | 370/395.1 |
| 2007/0036343 A1 * | 2/2007 | Sudo et al. | 379/406.01 |

FOREIGN PATENT DOCUMENTS

| | | | |
|---|---|---|---|
| JP | 5073085 A | 3/1993 | |
| JP | 11304906 A | 11/1999 | |
| JP | 2000-267683 A | 9/2000 | |
| JP | 2008-141593 A | 6/2008 | |
| JP | 2008-219088 A | 9/2008 | |

* cited by examiner

*Primary Examiner* — Quynh Nguyen
(74) *Attorney, Agent, or Firm* — Rabin & Berdo, P.C.

(57) ABSTRACT

In a telephone device, a near-end signal processor delays each input near-end signal delivered from the respective microphones by a delay amount, and synthesizes the input near-end signals into a synthesized near-end signal. In an echo canceller, mounted on board the telephone device, a far-end signal is delayed by the same delay amounts as used in the near-end signal processor to form plural delayed far-end signals, which are synthesized into a synthesized far-end signal, with which the echo component in the synthesized near-end signal will be suppressed.

8 Claims, 2 Drawing Sheets

ECHO CANCELLER OPERATIVE IN RESPONSE TO FLUCTUATION ON ECHO PATH

BACKGROUND OF THE INVENTION

1. Field of the Invention

The present invention relates to an echo canceller, and more particularly to an echo canceller applicable to, for example, a telephone device using one or more microphones having the directivity thereof variable to capture the voice.

2. Description of the Background Art

Recently, as with the audio conferencing system, the mode of communications becomes popular which exploits a sound capturing system, such as a microphone array, having its directivity of sound capturing settable to a specific direction.

Among the solutions that control the sound capturing directivity by the microphone array, there is a sound capturing device disclosed by Japanese patent laid-open publication No. 2008-141593 to Hioka et al. Hioka et al., teaches the sound capturing device adapted for controlling the sound capturing directivity by delaying and summing voice signals obtained from plural microphones so that these voice signals will be in phase with one another.

Further, among the communications systems employing microphones having the sound capturing directivity, there is a system that has the function of detecting the direction of the sound source and automatically sets the sound capturing directivity into alignment with the direction towards the sound source in order to trace the movement of the sound source. An example of such a conventional solution is the method described in Japanese patent laid-open publication No. 304906/1999 to Tanaka. In the method taught by Tanaka, the function of tracking the sound source in its movement consists in calculating the cross correlation of signals acquired by plural microphones with the delay amount varied, and determining the delay amount when the cross correlation is maximum so as to estimatively locate the sound source from the information on the positions of the microphones and the delay amount. In order to set the directivity into alignment with the estimated direction of the sound wave, the delay amount to be used in the delaying and summation is set to the value of the delay amount thus found. By this function, when a new speaker, or talker, utters during the conference, the sound capturing directivity may automatically be set towards the new speaker, thus allowing the uttered contents to be transmitted clearly.

In order to accomplish bidirectional voice communications while howling is suppressed, the use of an echo canceller is necessary. As taught by Japanese patent laid-open publication No. 2008-219088 to Takahashi, paragraphs 0019-0021, the echo canceller suffers a problem that, if an echo path varies, the sound quality is deteriorated.

Viz., the echo canceller suffers from the difficulty that the sound quality may be deteriorated if the echo path has changed. That may also be caused when the directivity of the microphone array is controlled to render the echo path varying. With the conventional solution of detecting the echo path changing, it is necessary to carry out a sort of statistic processing, such as observing the variations in the convergence characteristics of the echo canceller or observing the specific values of the cross correlation matrix, with the result that time required in detecting the echo path variations is protracted.

To overcome the fluctuations in the echo path, the step gain of the adaptive filter is to be simply increased in response to the path fluctuations detected to accelerate the adaptive operation of the adaptive filter, thus affecting the operation of the adaptive filter. In this solution, the convergence is accelerated, indeed. However, this solution suffers a problem that the adaptive filter may sometimes not converge to its optimum value.

SUMMARY OF THE INVENTION

It is therefore an object of the invention to provide an echo canceller in which a synthesized sound, obtained on synthesizing near-end voice captured by a plurality of microphones, may be improved in sound quality.

In accordance with the present invention, a telephone device comprises: a loudspeaker radiating sound of a far-end signal; a plurality of microphones each capturing a near-end voice to produce an input near-end signal; a near-end signal processor that delays each of the input near-end signals by a predetermined delay amount associated with the input near-end signal to thereby form a corresponding plurality of delayed input near-end signals, and synthesizes the delayed input near-end signals to thereby form a single synthesized input near-end signal; and an echo canceller that removes an echo component from the synthesized input near-end signal to transmit a resulting signal to a far-end side, wherein the echo canceller comprises: a delayed far-end signal forming section delaying the far-end signal by the delay amounts to thereby form a corresponding plurality of delayed far-end signals; a synthesized far-end signal forming section synthesizing the delayed far-end signals to thereby form a single synthesized far-end signal; and an echo suppressor using the synthesized far-end signal to suppress the echo component of the synthesized near-end signal.

With the telephone device of the present invention, the synthesized voice, obtained on capturing and synthesizing the near-end voice using a plurality of microphones, may be improved in sound quality.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
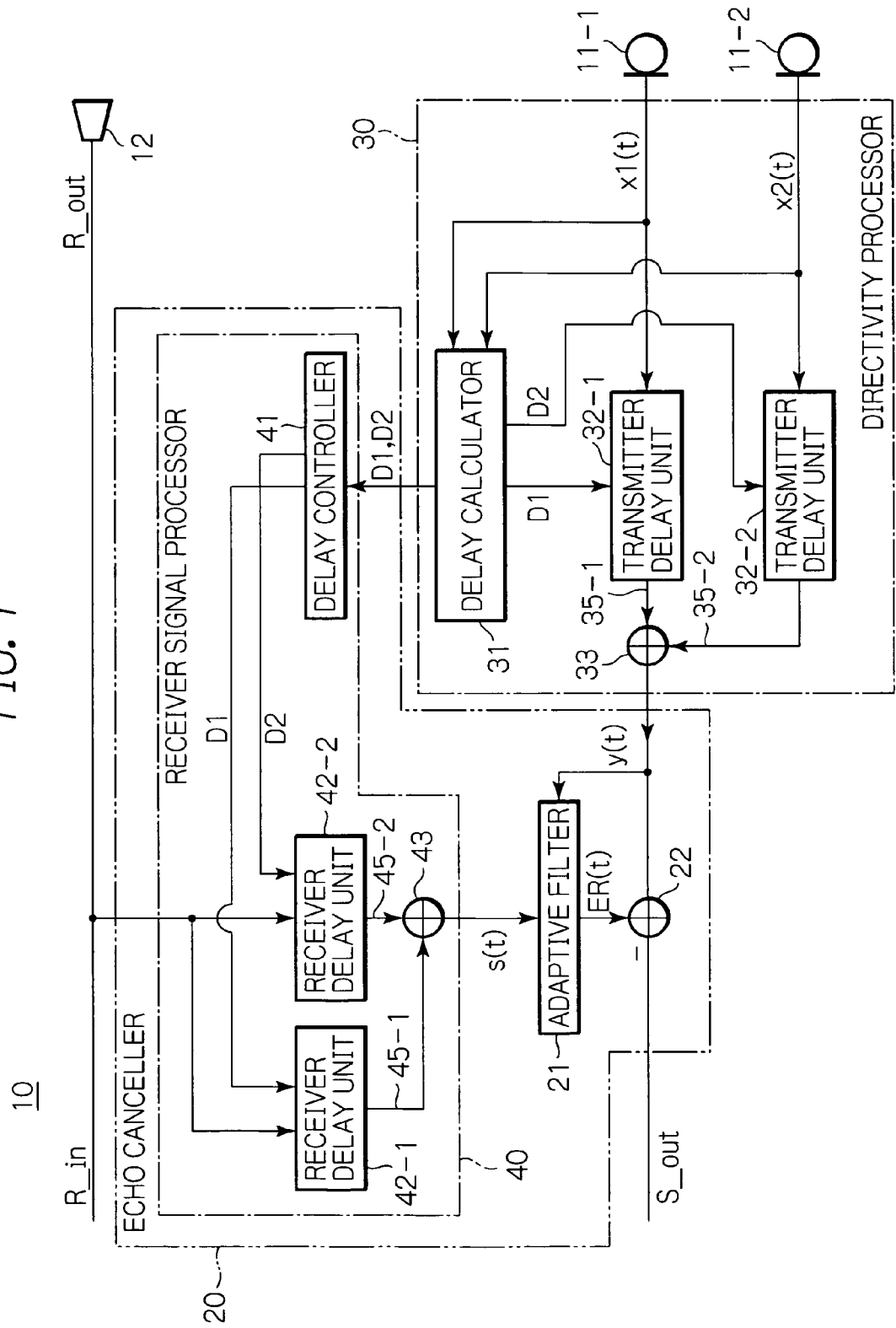
FIG. 1 is a schematic block diagram showing an overall arrangement of a preferred embodiment of the telephone device in accordance with the present invention.

Preferred embodiments of an echo canceller according to the present invention will now be described in detail with reference to the drawings. With reference first to FIG. 1, a telephone device 10 will be described which has an on-board echo canceller 20 of the preferred embodiment. The telephone device 10 includes a couple of microphones 11-1 and 11-2, a loudspeaker 12, an echo canceller 20 and a directivity processor 30, which are interconnected as illustrated. The telephone device 10 is advantageously applicable to, for example, a telephone terminal device for audio conferencing.

The echo canceller 20 may be implemented by program sequences designed for echo cancellation installed on an information processor system adapted for executing the program sequences, such as a computer, including, for example, a CPU (Central Processor Unit), ROM (Read-Only Memory), RAM (Random-Access Memory), EEPROM (Electrically Erasable and Programmable ROM) and a hard disc drive or the like. In lieu of a single information processor system, the audio conference system may also be implemented by a plurality of information processors interconnected to perform distributed processing. Even in the latter case, the resulting configuration may be functionally represented in the form of schematic block diagram of FIG. 1. In this connection, the word "circuit" may be understood not only as hardware, such as an electronics circuit, but also as a function that may be implemented by software installed and executed on a computer. The constituent elements of the echo canceller 20 may be implemented in their entirety by hardware, or some of those elements may be implemented by the software, i.e. program sequences, installed on board the information processor system. The components of the telephone device 10 other than the echo canceller 20, such as the directivity processor 30, may similarly be implemented by software installed on the information processor system.

The telephone device 10 is a terminal device, as shown in FIG. 1, adapted to receive a far-end input signal R_in and output the received signal as a far-end output signal R_out to the loudspeaker 12, which in turn outputs, or radiates, the voice audible to a near-end listener, who may be a near-end speaker, or talker.

Now, the telephone device 10 includes a couple of near-end input signal streams generated by the microphones 11-1 and 11-2, and circuit components respectively associated with the signals 11-1 and 11-2. As seen from the figure, those two streams of signal and two systems of circuitry associated therewith may be designated with the respective reference numerals together with hyphenated subsidiary numerals "-1" and "-2", and referred to as "first" and "second", respectively.

In the telephone device 10, as shown in FIG. 1, a first near-end input signal $x1(t)$ produced by the first microphone 11-1 and a second near-end input signal $x2(t)$ produced by the second microphone 11-2 representing the voice captured from the same near-end speaker are processed by the directivity processor 30 so that the first and second near-end input signals will be in phase with each other. A resultant in-phase signal, i.e. synthesized near-end input signal, y(t) thus formed is delivered to the echo canceller 20, specifically to an adaptive filter 21 and a subtractor 22 therein which will be described later. More specifically, in the telephone device 10, the couple of microphones 11-1 and 11-2 and the directivity processor 30 form a so-called microphone array, which is adapted to render the near-end input signals $x1(t)$ and $x2(t)$ in phase with each other, and synthesize, or combine, them together, so that the sound capturing directivity of the microphones is aligned with the direction towards a sound source, that is, near-end speaker.

The echo canceller 20 serves as removing a possible echo component from the synthesized near-end input signal y(t), and the resulting signal is output as a near-end output signal S_out.

The couple of microphones 11-1 and 11-2, and the directivity processor 30 will now be described in detail. The microphones 11-1 and 11-2 per se may be ones already existing onboard a telephone terminal device or audio conference terminal device in which the telephone device 10 is installed.

The directivity processor 30 will now be described in detail. As shown in FIG. 1, the directivity processor 30 includes a delay calculator 31, two transmitter delay units 32-1 and 32-2, and an adder 33 which are interconnected as depicted.

The delay calculator 31 functions as receiving the near-end input signals $x1(t)$ and $x2(t)$ to calculate the delay amount, i.e. delay time, of each of the near-end input signals $x1(t)$ and $x2(t)$ such that both signals may be in phase with each other. The delay calculator 31 calculates such delay amounts D1 and D2 to be applied to the near-end input signals $x1(t)$ and $x2(t)$, respectively. The delay amounts D1 and D2 thus calculated are applied from the delay calculator 31 to the transmitter delay units 32-1 and 32-2, respectively. The delay calculator 31 also applies the delay amounts D1 and D2 to a receiver signal processor 40, more specifically, to a delay controller 41. In the specification, signals or data are designated with reference numerals or codes of connections on which they are conveyed.

The delay calculator 31 may be adapted for calculating the delay amount by means of the sound source estimation and delay weighted calculation described in, for example, Tanaka stated earlier. Other methods for calculating delay amount are applicable so far as the delay amount may be calculated such as to make near-end input signals $x1(t)$ and $x2(t)$ in phase with each other.

The transmitter delay unit 32-1 is adapted to responsive to the delay amount D1 given from the delay calculator 31 to delay the near-end input signal $x1(t)$ by the delay amount D1 to deliver the so delayed signal 35-1 to the one input of the adder 33. Similarly, the other transmitter delay unit 32-2 is adapted to responsive to the delay amount D2 given from the delay calculator 31 to delay the near-end input signal $x2(t)$ by the delay amount D2 to deliver the so delayed signal 35-2 to the other input of the adder 33. The transmitter delay units 32-1 and 32-2 may be operative as the filter processor or delay unit disclosed in Hioka et al., described earlier, or the delay unit described in Tanaka.

The adder 33 has the function of synthesizing the signals 35-1 and 35-2 delivered from the transmitter delay units 32-1 and 32-2 together to form a synthesized near-end input signal y(t) to deliver the signal y(t) to the adaptive filter 21 and the adder 22, which could be a subtractor.

The adder 33 per se may be a conventional type of signal synthesizer included in a conventional microphone array. For example, the adder disclosed in Hioka et al., or the adder stated in Tanaka is applicable. The synthesized near-end input signal y(t) may be thus obtained by summing the signals 35-1 and 35-2 supplied from the transmitter delay units 32-1 and 32-2. Alternatively, the synthesized near-end input signal y(t) may be formed by a residual signal obtained on subtracting one signal from the other, like with the adder of the microphone array described in U.S. Pat. No. 6,317,501 to Matsuo. Other methods for synthesizing the near-end input signal y(t) may of course be applied.

The synthesized near-end input signal y(t), obtained by the directivity processor 30, may thus be formed by synthesizing the near-end input signals $x1(t)$ and $x2(t)$ together in a state the signals are in phase with each other. Hence, the directivity in connection with the synthesized near-end input signal is aligned with the direction towards the sound source.

The arrangement of the echo canceller 20 will now be described in detail. The echo canceller 20 serves as removing a possible echo component from the synthesized near-end input signal y(t) to output the resulting signal as the near-end output signal S_out towards a far-end receiver, as previously mentioned. The echo canceller 20 includes an adaptive filter 21, the adder 22 and the receiver signal processor 40, which are interconnected as depicted in FIG. 1.

The receiver signal processor 40 will now be described in detail. The receiver signal processor 40 includes a delay controller 41, a couple of receiver delay units 42-1 and 42-2, and another adder 43, which are interconnected as illustrated.

The delay controller 41 is supplied from the delay calculator 31 with the delay amounts D1 and D2 to control the receiver delay units 42-1 and 42-2 depending on the delay amounts D1 and D2, respectively. The delay controller 41 applies the delay amounts D1 and D2 to the receiver delay units 42-1 and 42-2, respectively.

The receiver delay units 42-1 is adapted to be responsive to the delay amount D1 supplied from the delay controller 41 to delay the far-end input signal R_in by the time corresponding to the delay amount D1 to deliver the so delayed signal 45-1 to on input of the adder 43. The receiver delay units 42-2 is adapted to be responsive to the delay amount D2 supplied from the delay controller 41 to delay the far-end input signal R_in by the time corresponding to the delay amount D2 to deliver the so delayed signal 45-2 to other input of the adder 43. The receiver delay units 42-1 and 42-2 per se may be conventional delay units analogously to the transmitter delay unit 32 described above.

The adder 43 has the function of synthesizing the delayed signals 45-1 and 45-2 supplied from the receiver delay units 42-1 and 42-2, respectively, and delayed from the far-end input signal R_in, to produce a resultant signal, synthesized far-end input signal s(t) to the adaptive filter 21.

Similarly to the adder 33, the adder 43 itself may be any suitable conventional type of adder. It is to be noted however that the adders 43 and 33 may preferably be equivalent in function to each other. Viz., the adders 33 and 43 may advantageously be the same between how the transmitter adder 33 synthesizes the signal 35-1 supplied from the transmitter delay unit 32-1 with the signal 35-2 supplied from the transmitter delay unit 32-2 and how the receiver adder 43 synthesizes the signal 45-1 supplied from the receiver delay unit 42-1 with the signal 45-2 supplied from the receiver delay unit 42-2. For example, in an application where the transmitter adder 33 is adapted to subtract the signal 35-2 supplied by the transmitter delay unit 32-2 from the signal 35-1 supplied by the transmitter delay unit 32-1, the receiver adder 43 is adapted to perform equivalent processing, viz., to subtract the signal 45-2 supplied by the receiver delay unit 42-2 from the signal 45-1 supplied by the receiver delay unit 42-1.

The adaptive filter 21 has the function of generating a pseudo echo ER(t) to deliver the so generated pseudo echo to the one input of the adder 22. More specifically, the adaptive filter 21 is supplied with the synthesized far-end input signal s(t) and the synthesized near-end input signal y(t) to generate the pseudo echo ER(t) to route the so generated pseudo echo ER(t) to the adder 22. The adder 22 is adapted to subtract the pseudo echo ER(t) from the synthesized near-end input signal y(t) to thereby suppress the echo component possibly included in the synthesized near-end input signal y(t). The adaptive filter 21 and the adder 22 may be analogous to those included in an echo canceller employing a conventional adaptive filter. The adaptive filter 21 may work by any suitable well-known adaptive algorithm, such as a learning identification method.

The operation of the telephone device 10 of the illustrative embodiment, having the above arrangement, will now be described with reference to FIG. 1. In the telephone device 10, when a near-end speaker utters a speech, his/her voice is captured by the microphones 11-1 and 11-2. The near-end input signal x1(t) is supplied from the microphone 11-1 to the delay calculator 31 and thence supplied to the transmitter delay unit 32-1. Similarly, the near-end input signal x2(t) is supplied from the microphone 11-2 to the delay calculator 31 and thence supplied to the transmitter delay unit 32-2.

The delay calculator 31 calculates the delay amounts D1 and D2 based on the near-end input signals x1(t) and x2(t). The delay calculator 31 routes the delay amount D1 to the transmitter delay unit 32-1 and the delay controller 41, while routing the delay amount D2 to the transmitter delay unit 32-2 and to the delay controller 41.

The transmitter delay unit 32-1 delays the near-end input signal x1(t) added by a time corresponding to the delay amount D1. The so delayed signal 35-1 is routed to the one input to the adder 33. Analogously, the other transmitter delay unit 32-2 delays the near-end input signal x2(t) added by a time corresponding to the delay amount D2. The so delayed signal 35-2 is also routed to the other input to the adder 33.

The adder 33 synthesizes the signals 35-1 and 35-2 from the transmitter delay units 32-1 and 32-2 to output the resulting synthesized signal y(t) to the adaptive filter 21 and the adder 22.

On the receiver side, the delay controller 41, when supplied with the delay amounts D1 and D2 from the delay calculator 31, transfers the delay amounts D1 and D2 to the receiver delay units 42-1 and 42-2, respectively.

The receiver delay unit 42-1 delays the far-end input signal R_n by a time corresponding to the delay amount D1, and routes the so delayed signal 45-1 to the one input to the adder 43. Likewise, the receiver delay unit 42-2 delays the far-end input signal R_in by a time corresponding to the delay amount D2, and routes the so delayed signal 45-2 to the other input to the adder 43.

The adder 43 in turn synthesizes the signals 45-1 and 45-2 from the receiver delay units 42-1 and 42-2 to each other, and routes the resulting synthesized signals (t) to the adaptive filter 21.

The adaptive filter 21 generates the pseudo echo ER(t) to deliver the so generated pseudo echo to the one input port to the adder 22. More specifically, the adaptive filter 21 is supplied with the synthesized far-end input signal s(t) and the synthesized near-end input signal y(t) to generate the pseudo echo ER (t), which will be used for removing a possible echo component from the synthesized near-end input signal y(t). The adaptive filter 21 routes the so generated pseudo echo ER (t) to the one input to the adder 22. The adder 22 subtracts the pseudo echo ER (t) from the synthesized near-end input signal y(t), input on its other input port, to thereby suppress the echo component. The resulting signal S_out will be transmitted to the far-end side.

The illustrative embodiment may yield the following beneficial results. The echo canceller 20 may deal with such a case where, for example, the location of the sound source, i.e. near-end speaker, is changed, i.e. moves or shifted, such that the directivity of the microphone array is changed by the directivity processor 30 to change the echo path, resulting in changes in the delay amounts D1 and D2 applied respectively to the transmitter delay units 32-1 and 32-2. In such a case, the echo canceller 20 readily forms the synthesized far-end input signal s(t) in which the changes in the delay amounts are reflected. The echo canceller 20 routes the so formed signal s(t) to the adaptive filter 21 for use in suppressing the echo component. The echo canceller 20 may thus deliver the far-end input signal s(t), in which the varied delay amounts D1 and D2 have been reflected, to the adaptive filter 21. The varied delay amounts may thus be reflected in the far-end input signal s(t), not by the adaptive operation of the adaptive filter 21 but rather by the operation of the directivity processor 30, thus being able to cope with changes in the echo path attendant on changes in directivity.

Thus, in the illustrative embodiment, the echo canceller 20 may promptly deal with changes in the echo path brought about by changes in directivity, and may be run in operation in stability without any adverse effects on the operation of the adaptive filter 21. Hence, the echo canceller 20 may follow changes in the location of a sound source without deteriorating the sound quality. Factors other than changes in directivity, such as sound caused by wind or the operation of air conditioning equipment surrounding the proximal-end speaker may be in the nature thereof fixed to a more or less extent that they may be coped with just by the adaptive filter 21 to prevent deterioration in the sound quality.

In the conventional solutions disclosed by Hioka et al., and Tanaka, there lacks an arrangement corresponding to the receiver signal processor 40. Suppose that the arrangement of the receiver signal processor 40 would be omitted from the telephone device 10 of the illustrative embodiment shown in FIG. 1 so that the far-end input signal R_in is directly supplied to the adaptive filter 21. The echo signal component coming from the loudspeaker 12 and captured by the microphones 11-1 and 11-2 are delayed by the transmitter delay units 32-1 and 32-2. The delay given by the transmitter delay units 32-1 and 32-2 causes the part of the near-end input signals x1(t) and x2(t) which comes from the sound source, or near-end speaker, to be rendered in phase with each other. However, the near-end input signal y(t) would be developed without rendering the echo component caused by the loudspeaker 12 in phase because of the difference in the relative position of the loudspeaker 12 from the sound source, or near-end speaker, for example. Hence, a simple use of the conventional adaptive filter could not cause the echo component in the synthesized near-end input signal y(t), not rendered in phase, to be correctly reproduced as a pseudo echo.

In the echo canceller 20 of the illustrative embodiment, the receiver signal processor 40 is provided to form the far-end input signal s(t), which is a sum signal of a signal delayed from the far-end input signal R_in by the delay amount D1 and a signal delayed from the far-end input signal R_in by the delay amount D2. Thus, the echo component which is not in phase in the synthesized near-end input signal y(t) may correctly be reproduced. By routing the synthesized far-end input signal s(t) to the adaptive filter 21, the echo component in the synthesized near-end input signal y(t), not rendered in phase and impossible to reproduce in the conventional system, may correctly be reproduced as a pseudo echo. Thus, in the telephone device 10, it is possible to improve the sound quality more effectively than in the telephone device employing the conventional echo canceller.

In the echo canceller 20, it is unnecessary to separately use an adaptive filter having a plurality of parameters to cope with fluctuations in the echo path brought about by changes in directivity. It is thus possible to promptly cope with fluctuations in the echo path brought about by changes in directivity by a simpler arrangement as described above.

A telephone device according to an alternative embodiment of the present invention will now be described with reference to FIG. 2. In the illustrative embodiment shown in and described with reference to FIG. 1, a problem may arise that, if the delay amounts D1 and/or D2 are varied to trace changes in the position of sound source, the voice may jump so as to deteriorate the sound quality upon listening. To prevent this from occurring, there is added, in the alternative embodiment, the function of changing over the delay amounts during a non-speaking period, or unvoiced section, of the voice signal. In the following, the difference in the arrangement of the alternative embodiment from the embodiment shown in FIG. 1 will be described.

Figure 2:
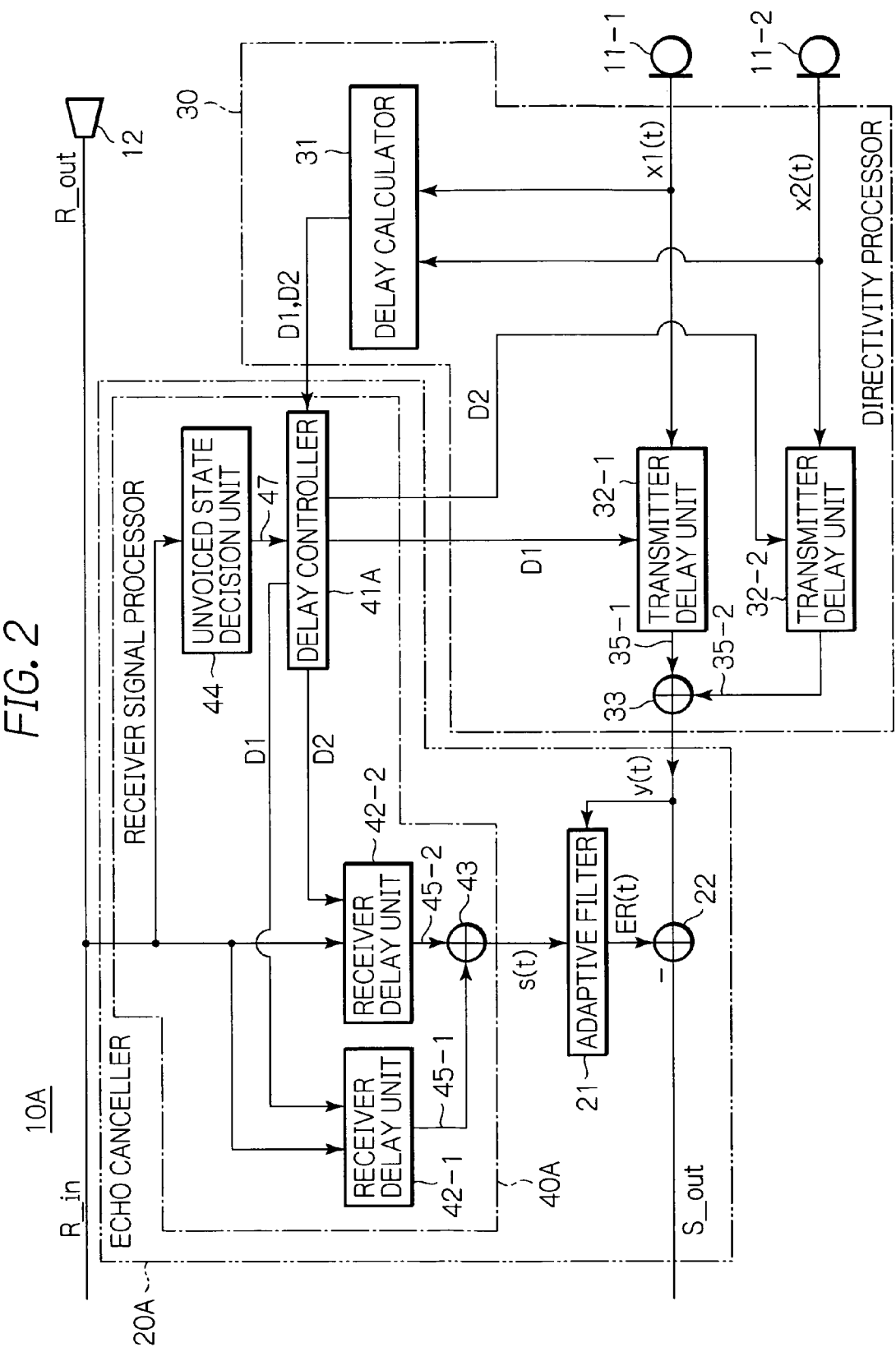
FIG. 2 is a schematic block diagram, like FIG. 1, showing an overall arrangement of an alternative embodiment of the telephone device of the present invention.

FIG. 2 is a schematic block diagram showing the overall arrangement of a telephone terminal device 10A of the alternative embodiment. Like components are designated with the same or corresponding reference numerals.

The telephone terminal device 10A may be the same as the telephone terminal device 10 illustrative embodiment shown in FIG. 1 except that an echo canceller 20A and a receiver signal processor 40A are respectively used in substitution for the echo canceller 20 and the receiver signal processor 40. The receiver signal processor 40A may be the same as the receiver signal processor 40 of the embodiment shown in FIG. 1 except that, as shown in FIG. 2, an unvoiced state decision unit 44 is newly provided and in that a delay controller 41A is used in substitution for the delay controller 41.

The unvoiced state decision unit 44 has the function of determining whether or not part of the far-end input signal R_in is currently an unvoiced period and supplying the result of decision 47 to the delay controller 41A. The unvoiced state decision unit 44 per se may be implemented by any suitable conventional unvoiced state decision means, such as used in the solutions described in, for example, Japanese patent laid-open publication No. 2000-267683 to Maeda or No. 73085/1993 to Nishiyama.

The delay controller 41A of the present alternative embodiment may be the same as the illustrative embodiment shown in FIG. 1 except that it changes the delay amounts supplied to the receiver delay units 42-1 and 42-2 only during the time it receives a decision result 47 representative of the current period being unvoiced from the unvoiced state decision unit 44. This means that the delay amounts supplied from the delay controller 41A to the receiver delay units 42-1 and 42-2 are changed not during the voiced period but only the unvoiced period of the far-end output signal R_out.

The operation of the telephone device 10A of the alternative embodiment will now be described. It is to be noted that, since the alternative embodiment differs from the embodiment shown in FIG. 1 in including the unvoiced state decision unit 44, the following description is centered about the operation of the unvoiced state decision unit 44 and its peripheral portions. The operation of the remaining portions of the echo canceller 20 may be the same as the embodiment shown in FIG. 1 and hence the repetitive description therefor is dispensed with.

Initially, the unvoiced state decision unit 44 decides whether the far-end input signal R_in is currently in a voiced or unvoiced state, and routes the result of decision 47 to the delay controller 41A. The delay controller 41A stores the delay amounts D1 and D2, when supplied from the delay calculator 31, for a predetermined period of time. In case the delay amounts D1 and/or D2 thus received is/are changed from the value/values of delay amount/amounts thus stored, the delay controller 41A refers to the result of decision 47 supplied from the unvoiced state decision unit 44. If the result of decision 47 supplied from the unvoiced state decision unit 44 is for 'voiced', or not 'unvoiced', no new delay amounts are routed to the receiver delay units 42-1 and 42-2. If conversely the result of decision 47 supplied from the unvoiced state decision unit 44 is for 'unvoiced', new delay amounts are transferred to the receiver delay units 42-1 and 42-2.

In the alternative embodiment, the following beneficial effect is displayed. In the echo canceller 20A, the delay amounts supplied to the receiver delay units 42-1 and 42-2 are changed over only during the unvoiced period detected by means of the unvoiced state decision unit 44. By so doing, voice in the near-end output signal S_out may be prevented from jumping upon listening, thereby improving the sound quality of the near-end output signal S_out.

The present invention is not to be restricted to the specific illustrative embodiments described above, but may include following modifications which will be given only by way of illustration.

In the above-described embodiments, the telephone device includes a couple of microphones and a single loudspeaker. However, there is no limitation to the number of the microphones or loudspeakers. The receiver and transmitter delay units may be provided accordingly in number to the microphones provided.

The above-described embodiments are provided with a single adaptive filter, i.e. a single channel. However, there is no reason why the single channel is. The number of channels may depend on the number of the microphones and/or loudspeakers. For example, if two microphones and two loudspeakers are provided, two adaptive filters may be provided accordingly, in which case the echo canceller may operate as a stereophonic echo canceller.

In the above-described embodiments, the delay calculator is adapted to calculate the delay amounts based on input signals of the two microphones. Viz., the delay calculator calculates delay amounts for automatic follow-up in order to set the directivity in alignment with the direction towards a sound source, or near-end talker. Alternatively, the delay amounts may be calculated in response to a user's manipulation or under the control of an external device so that the directivity is aligned with the direction towards a desired site or with a desired orientation.

In addition, in the above-described embodiments, the directivity processor of the echo canceller is designed, intending to give directivity to the input near-end signals supplied from multiple microphones, to generate delay amounts with which a near-end signal is synthesized in phase. Alternatively, not for the purpose of giving directivity to the input near-end signals but simply rendering a near-end signal synthesized in phase, the directivity processor may be adapted to generate delay amounts.

The entire disclosure of Japanese patent application No. 2009-116659 filed on May 13, 2009, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A telephone device comprising:
    a loudspeaker radiating sound of a far-end signal;
    a plurality of microphones each capturing a near-end voice to produce an input near-end signal;
    a near-end signal processor that delays each of the input near-end signals by a delay amount associated with the input near-end signal to thereby form a corresponding plurality of delayed input near-end signals, and that synthesizes the delayed input near-end signals to each other to thereby form a single synthesized input near-end signal; and
    an echo canceller that removes an echo component from the synthesized input near-end signal to transmit a resulting signal to a far-end side,
    wherein said echo canceller comprises
        a delayed far-end signal forming section delaying the far-end signal by the delay amounts to thereby form a corresponding plurality of delayed far-end signals,
        a synthesized far-end signal forming section synthesizing the delayed far-end signals to each other to thereby form a single synthesized far-end signal, and
        an echo suppressor using the synthesized far-end signal to suppress the echo component of the synthesized near-end signal.

2. The telephone device in accordance with claim 1, wherein the delay amounts are set to values with which the input near-end signals are rendered in phase with one another.

3. The telephone device in accordance with claim 1, further comprising:
    an unvoiced state decision section for determining whether or not the far-end signal is in an unvoiced state,
    wherein said synthesized far-end signal forming section does not update the delay amounts for use in forming the delayed far-end signals unless said unvoiced state decision section determines that the far-end signal is currently in the unvoiced state.

4. The telephone device in accordance with claim 1, wherein the input near-end signals are different in phase, and the near-end signal processor comprises means for a matching the input near-end signals in phase and adding them together to form the synthesized near-end signal.

5. An echo canceller for use in a telephone device that includes
    a loudspeaker radiating sound of a far-end signal;
    a plurality of microphones each capturing a near-end voice to produce an input near-end signal; and
    a near-end signal processor that delays each of the input near-end signals by a delay amount associated with the input near-end signal to thereby form a corresponding plurality of delayed input near-end signals, and synthesizes the delayed input near-end signals to each other to thereby form a single synthesized input near-end signal,
    wherein said echo canceller removes an echo component from the synthesized input near-end signal to transmit a resulting signal to a far-end side, and comprises:
    a delayed far-end signal forming section delaying the far-end signal by the delayed amounts to thereby form a corresponding plurality of delayed far-end signals;
    a synthesized far-end signal forming section synthesizing the delayed far-end signals to each other to thereby form a single synthesized far-end signal; and
    an echo suppressor using the synthesized far-end signal to suppress the echo component of the synthesized near-end signal.

6. The echo canceller in accordance with claim 5, wherein the input near-end signals are different in phase, and the near-end signal processor comprises means for a matching the input near-end signals in phase and adding them together to form the synthesized near-end signal.

7. A non-transitory computer-readable storage medium in which is stored a program for echo cancellation for allowing a computer installed on a telephone device, which comprises a loudspeaker radiating sound of a far-end signal, a plurality of microphones each capturing a near-end voice to produce an input near-end signal, a near-end signal processor that delays each of the input near-end signals by a delay amount associated with the input near-end signal to thereby form corresponding plurality of delayed input near-end signals and that synthesizes the delayed input near-end signals to each other to thereby form a single synthesized input near-end signal, and an echo canceller that removes an echo component from the synthesized input near-end signal to transmit a resulting signal to a far-end side, to operate as:
- a delayed far-end signal forming section delaying the far-end signal by the delayed amounts to thereby form a corresponding plurality of delayed far-end signals;
- a synthesized far-end signal forming section synthesizing the delayed far-end signals to each other to thereby form a single synthesized far-end signal; and
- an echo suppressor using the synthesized far-end signal to suppress the echo component of the synthesized near-end signal.

8. The non-transitory computer-readable storage medium in accordance with claim 7, wherein the input near-end signals are different in phase, and the near-end signal processor comprises means for a matching the input near-end signals in phase and adding them together to form the synthesized near-end signal.

* * * * *